US008185377B2

(12) United States Patent
Zhou

(10) Patent No.: US 8,185,377 B2
(45) Date of Patent: May 22, 2012

(54) DIAGNOSTIC EVALUATION OF MACHINE TRANSLATORS

(75) Inventor: Ming Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 967 days.

(21) Appl. No.: 12/147,750

(22) Filed: Jun. 27, 2008

(65) Prior Publication Data

US 2009/0157386 A1    Jun. 18, 2009

Related U.S. Application Data

(66) Substitute for application No. 60/955,349, filed on Aug. 11, 2007.

(51) Int. Cl.
*G06F 17/27* (2006.01)
(52) U.S. Cl. ................................. 704/9; 704/7
(58) Field of Classification Search ................ 704/1–10, 704/270, 277, 270.1, 251, 257, 272
See application file for complete search history.

(56) References Cited

U.S. PATENT DOCUMENTS

| | | | |
|---|---|---|---|
| 5,408,410 A | | 4/1995 | Kaji |
| 5,907,821 A | * | 5/1999 | Kaji et al. ........................ 704/4 |
| 6,182,026 B1 | | 1/2001 | Tillmann et al. |
| 6,602,300 B2 | | 8/2003 | Ushioda et al. |
| 6,996,518 B2 | | 2/2006 | Jones et al. |
| 7,054,803 B2 | | 5/2006 | Eisele |
| 7,653,531 B2 | * | 1/2010 | Sneddon et al. ................ 704/10 |
| 2003/0204400 A1 | | 10/2003 | Marcu et al. |
| 2004/0230418 A1 | | 11/2004 | Kitamura |
| 2004/0243387 A1 | | 12/2004 | De Brabander |
| 2004/0255281 A1 | | 12/2004 | Imamura et al. |
| 2007/0129935 A1 | | 6/2007 | Uchimoto et al. |

OTHER PUBLICATIONS

Margeret King et al., "Using Test Suites in Evaluation of Machine Translation Systems" 1990. pp. 211-216.
Philipp Koehn. "Europarl: A Multilingual Corpus for Evaluation of Machine Translation" Dec. 28, 2002. Information Sciences Institute, University of Southern California. 19 pages.
Kishore Papineni et al., "BLEU: a Method for Automatic Evaluation of Machine Translation" Proceedings of the 40th Annual Meeting of the Association for Computational Linguistics (ACL), Philadelphia, Jul. 2002, pp. 311-318.
Keh-Yih Su et al., "A New Quantitative Quality Measure for Machine Translation Systems" Proc. of COLING-92, Aug. 23-28, 1992. pp. 433-439.

* cited by examiner

*Primary Examiner* — Huyen X. Vo
(74) *Attorney, Agent, or Firm* — Westman, Champlin & Kelly, P.A.

(57) ABSTRACT

A system for evaluating translation quality of a machine translator is discussed. The system includes a bilingual data generator configured to intermittently access a wide area network and generate a bilingual corpus from data received from the wide area network. The method also includes an example extraction component configured to receive an ontology input indicative of a plurality of ontological categories of evaluation and to extract evaluation examples from the bilingual corpus based on the ontology input. The system further includes an evaluation component configured to evaluate translation results from translation by a machine translator of the evaluation examples and to score the translation results according to the ontological categories.

20 Claims, 7 Drawing Sheets

Candidate: the book is on the desk

Reference 1: there is a book on the desk
Reference 2: the book is on the table

| unigram | bigram | trigram |
|---|---|---|
| Count(the) = 2 | Count(the, book) = 1 | Count(the, book, is) = 1 |
| Count(book) = 1 | Count(book, is) = 1 | Count(book, is, on) = 1 |
| Count(is) = 1 | Count(is, on) = 1 | Count(is, on, the) = 1 |
| Count(on) = 1 | Count(on, the) = 1 | Count(on, the, desk) = 1 |
| Count(desk) = 1 | Count(the, desk) = 1 | |

$$\sum_{unigram \in C} Count(unigram) = 6 \quad \sum_{bigram \in C} Count(bigram) = 5 \quad \sum_{trigram \in C} Count(trigram) = 4$$

$$p_1 = 1 \qquad p_2 = 1 \qquad p_3 = 1$$

$$\left. \begin{array}{l} c = 6 \\ r = 6 \end{array} \right\} = e^{1-\frac{r}{c}} = e^0 = 1 = BP$$

$$BLEU = BP \cdot \exp\left( \sum_{n=1}^{N} w_n \log p_n \right) = \exp\left[ \frac{1}{3}(\log 1 + \log 1 + \log 1) \right] = \sqrt[3]{1 \cdot 1 \cdot 1} = 1$$

FIG. 3

DIAGNOSTIC EVALUATION OF MACHINE TRANSLATORS

CROSS REFERENCE TO RELATED APPLICATIONS

This application is related to and claims priority from U.S. Provisional Patent Application No. 60/955,349, entitled "Linguistic Evaluation of Machine Translation" filed on Aug. 11, 2007.

BACKGROUND

The present discussion is directed toward machine translation systems for translating text from one language to another. More particularly, the present discussion is directed toward the evaluation of machine translation systems.

Machine translation systems are used to automatically translate text from one language to another. Machine translation systems provide a fast and cost effective way to translate large amounts of text that would otherwise require labor intensive work by human translators. The use of machine translations can greatly simplify translation tasks and effective machine translation systems provide great utility for those who have translation requirements.

Because of the sometimes large differences between two different languages, machine translation systems may be faced with a number of different issues to provide a quality translation between one language and another. For example, different human languages not only have different individual words to express a particular thought, but may also include a number of different types of linguistic phenomena that make automated translation a challenging task. An example of such a linguistic phenomena is the ambiguity of definition that certain words have. That is, a given word in one language can have a plurality of meanings. Thus, to perform a proper translation from a source language to a target language, a machine translation system must not only recognize the word in the source language, but understand its meaning by, for example, the context in which the word is being used. There are many other types of linguistic phenomena, including, for example, the organization of sentences, the use of idioms, and so forth.

Machine translation systems can be evaluated by providing text to be translated and manually determining the quality of the translation. Manually evaluating candidate translation systems, however, can be labor intensive and costly. Therefore, automated machine translation evaluation systems have been created to evaluate the performance of candidate machine translation systems so that such translation systems can be improved. Automated evaluation systems can provide information related to the performance of machine translation systems without the time and costs association with a manual evaluation system. As with the machine translation systems themselves, automated evaluation systems can be improved to provide more effective evaluations.

The discussion above is merely provided for general background information and is not intended to be used as an aid in determining the scope of the claimed subject matter.

SUMMARY

In one illustrative embodiment, a system for evaluating the translation quality of a machine translator is discussed. The system includes a bilingual data generator, an example extraction component, and an evaluation component. The bilingual data generator is configured to intermittently access a wide area network and generate a bilingual corpus from data received from the wide area network. The example extraction component is configured to receive an ontology input indicative of a plurality of ontological categories of evaluation and to extract evaluation examples from the bilingual corpus based on the ontology input. The evaluation component is configured to evaluate translation results from a translation by a machine translator of the evaluation examples and to score the translation results according to the ontological categories.

In another embodiment, a method of evaluating translation quality of a machine translator is discussed. The method includes intermittently generating and updating a bilingual corpus. The bilingual corpus is augmented with linguistic information generated from performing semantic analysis of the bilingual corpus. When the bilingual corpus is generated, evaluation examples are extracted. Each evaluation example is extracted to test the machine translator in one of a plurality of predefined categories of evaluation. The method further includes receiving translation results from the machine translator for the evaluation examples and evaluating the translation results in each of the predefined categories of evaluation. The evaluation results are then stored for display to a user.

In yet another embodiment, a method of creating an evaluation corpus to perform diagnostic evaluation of a machine translator that translates language from a source language to a target language is discussed. The method includes receiving from a data source a representation of textual data in the source language and a corresponding target language. A plurality of translation pairs is then extracted from the representation. Each translation pair includes data in the source language and a data corresponding to a translation in the target language. A checkpoint is selected from the plurality of translation pairs by assigning an ontological category to the source language portion of the translation pair. The checkpoint is then stored in an evaluation corpus.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3 is a chart illustrating an example of an evaluation of a candidate phrase against a reference using the Bleu metric.

DETAILED DESCRIPTION

Figure 1:
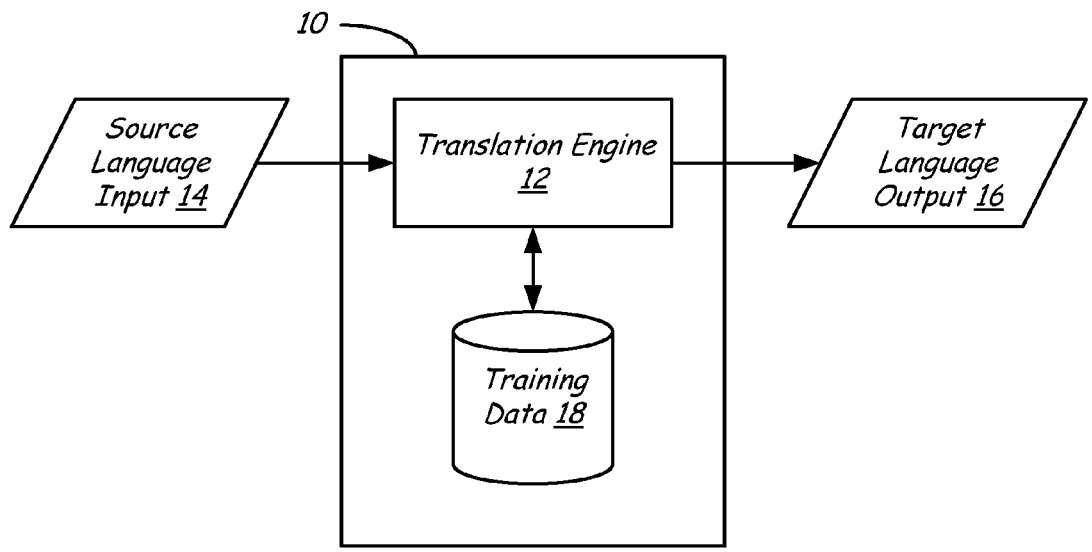
FIG. 1 is a simplified block diagram illustrating a machine translation system for translating a text representation from one language to another.

The present discussion is related to automated evaluation systems that are used to evaluate the performance of candidate machine translation systems such as the machine translation system 10 illustrated in FIG. 1. Machine translation system 10 includes a translation engine 12, which receives an input 14 in the form of a textual representation in a source language. The translation engine 12 then translates the source language input into a target language output 16. The translation engine 12 illustratively accesses a training database 18, which provides data to the translation engine to assist with the translation process. The data stored in the training database 18 can take any form, including aligned textual strings in each of the source and target languages.

Figure 2:
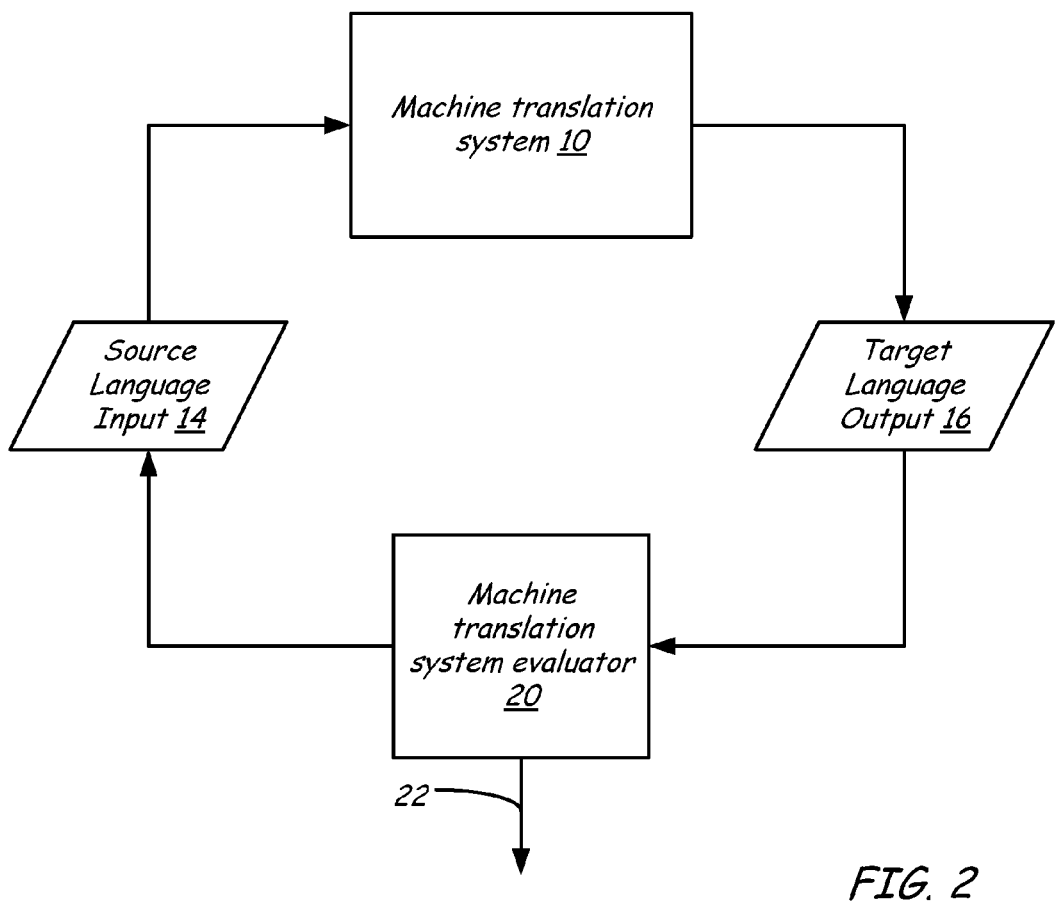
FIG. 2 is a simplified block diagram illustrating a machine translation system evaluator configured to interact with the machine translation system of FIG. 1 and provide an indication of the quality of a translation provided by the machine translation system.

FIG. 2 provides a simple block diagram illustrating a machine translation evaluator 20, which interacts with the machine translation system 10 and evaluates the performance of the machine translation system 10. Machine translation evaluator 20 provides the input 14 to the machine translation system 10 and receives the target language output 16. The machine translation evaluator 20 is configured to analyze the target language output 16 to determine the quality of the analysis. The machine translation evaluator 20 provides an output 22, which is an indication of the quality of the translation provided by the machine translation system 10. Representative embodiments of machine translation evaluators are provided in more detail below.

One type of machine translation system evaluator incorporates a so-called Bilingual Evaluation Understudy (BLEU) metric to analyze the quality of a translation provided by a machine translation system. The BLEU metric provides a single value to indicate the overall quality of a particular translation system. However, the BLEU metric does not provide individual indications of the performance of a particular machine translation system as it relates to the translation of individual linguistic phenomena. Prior to elaborating upon the particular features of embodiments related to the current discussion, a brief discussion of the BLEU metric is in order.

The BLEU metric calculates scores for individual segments of a translation and then averages these scores over the whole corpus to reach a final score. Specifically, the BLEU metric works by measuring the n-gram co-occurrence between a given translation and a set of reference translations. The weighted geometric mean the n-gram co-occurrences is then calculated. As one example, the quality of translation is indicated as a number between 0 and 1 and is measured as statistical closeness to a given set of good quality human reference translations. The Bleu metric can be described as follows:

$$BLEU = BP \cdot \exp\left(\sum_{n=1}^{N} W_n \log p_n\right)$$

$$\text{where } BP = \begin{cases} 1, & \text{if } c > r \\ e^{(1-r/c)}, & \text{if } c \leq r \end{cases}$$

The summation includes a weight factor, $w_n$ for each result $p_n$. Each result indicates a comparison between a candidate translation and a reference translation. BP illustratively provides a factor compensating for the length of each of the candidate and result strings in number of words. The number in words of the candidate phrase is represented by c and the length in number of words of the reference phrase is represented by r. If c>r, that is, if the candidate phrase includes more words than the reference phrase, BP equals 1, and no penalty factor is multiplied against the weighted mean. If c<=r, however, a factor $e^{(1-r/c)}$ is multiplied against the weighted mean. The weighted mean is the mean of N-gram evaluations of the candidate and result phrases. A single result, is then provided to indicate the quality of a particular candidate translation.

FIG. 3 illustrates an example of an evaluation of a candidate phrase against a reference using the Bleu metric by counting the n-grams that occur in both the candidate and reference phrases. In this instance, the candidate phrase is "the book is on the desk". The reference includes two phrases, "there is a book on the desk" and "the book is on the table". The results of the unigram, bigram, and trigram are shown in FIG. 3.

The first comparison in the Bleu metric is to count unigrams that occur in both the candidate and reference phrases. In each case, each of the n-grams in the candidate is found in the reference. As a result, the Bleu metric for this example is 1, which indicates a perfect Bleu metric score. In the case where the candidate phrase was "a book is on the desk", the unigram would have a count of six, the bigram would have a count of five, but the trigram would only have a count of three. This is because there is no instance of a trigram of "a book is" anywhere in the reference. Thus, the Bleu score would be less than one, but no further indication of the less than perfect comparison would be provided by the single score.

While the BLEU metric described here provides some information about the quality of a machine translation, it suffers from a number of drawbacks. For example, all of the n-grams of a sentence are treated equally, thereby ignoring the linguistic significance of a particular gram as it relates to a particular sentence. Furthermore, only consecutive grams are considered; skipped grams, that is, grams that include non-consecutive words that may have linguistic significance, are ignored. Furthermore, the BLEU metric credits a candidate translation only if it uses exactly the same lexicon as the reference, thereby ignoring valid variations in lexical choice.

Figure 4:
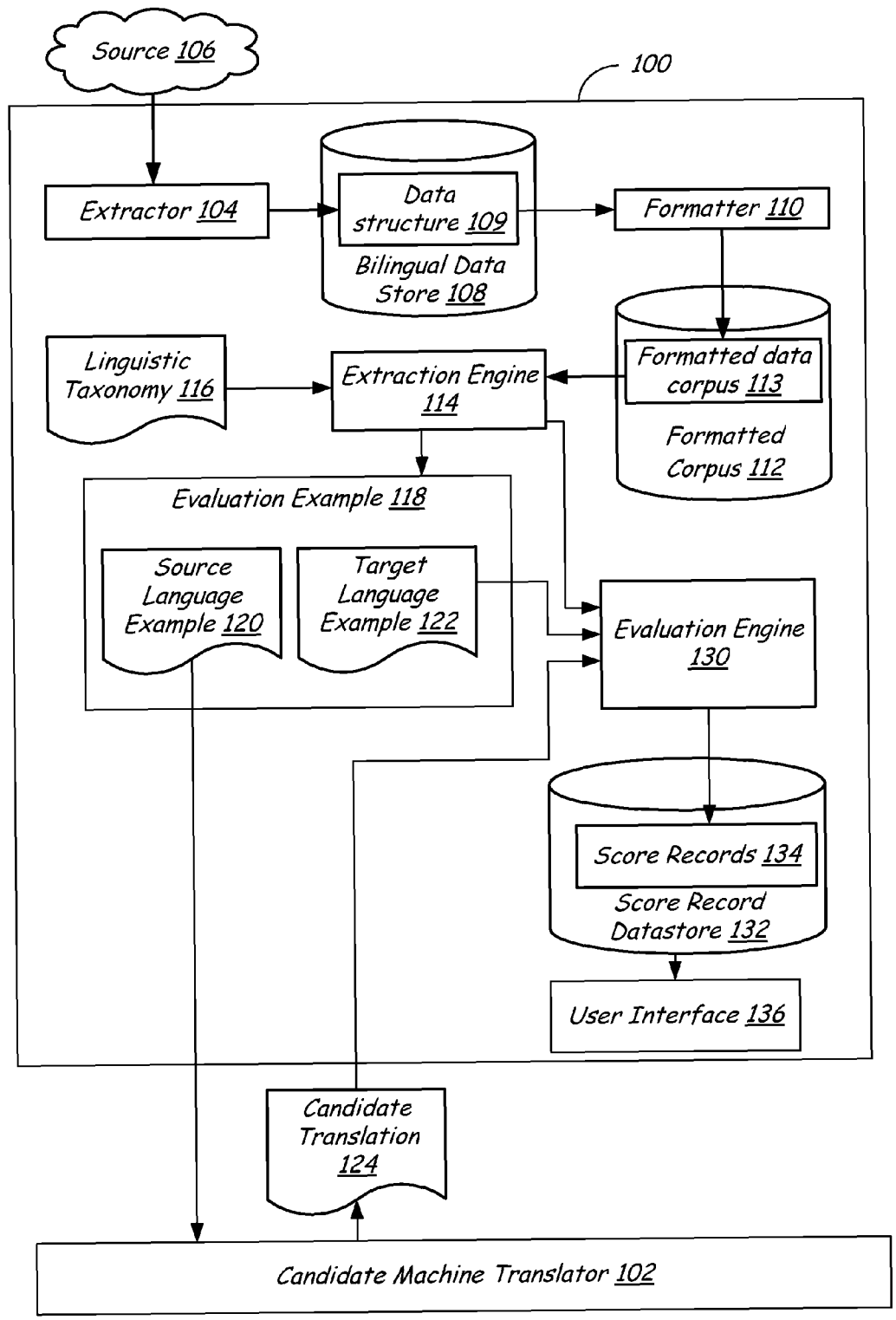
FIG. 4 illustrates a system configured to perform evaluation of candidate translations from a machine translator according to one illustrative embodiment.

As discussed below, embodiments of the current discussion provide linguistic evaluation of specific linguistic phenomena with results that indicate how well the candidate machine translation system translates specific linguistic phenomena as opposed to calculating just a single score for a translation overall. FIG. 4 illustrates an embodiment of a machine translation evaluation system 100 configured to evaluate the performance of translations created by a candidate machine translator 102 according to one illustrative embodiment. The machine translation evaluation system 100 and the candidate machine translator 102 discussed below are illustratively the type of machine translator and evaluation system illustrated in FIG. 2. Machine translation evaluation system 100 includes an extractor 104, which is configured to receive raw data from a source 106. In one illustrative embodiment, the source 106 is a data store accessible via, for example, a Wide Area Network such as the Internet. However, the source 106 is not limited to remotely accessible data stores and can be any source capable of providing candidate translation information to the extractor 104. The source 106 will be discussed in more detail below. The extractor 104 is configured to access the source 106 and generate a bilingual corpus by extracting bilingual data from the source 106 and organizing it into an extracted bilingual data structure 109.

Machine translation evaluation system 100 also illustratively includes a bilingual data store 108, which is configured to store the extracted bilingual data structure 109. The extracted bilingual data structure 109 includes information related to a text in a source language and a corresponding text translated into a target language. The bilingual data store 108 is accessible by the extractor 104. In one illustrative embodiment, the extracted bilingual data structure 109 stored in the bilingual data store 108 is arranged to include aligned sentences in the source and target languages. However, the extracted data structure can take on any acceptable form. For example, while the extracted data structure may include aligned sentences, alternatively, the data may just be aligned in a larger sense, that is, entire passages in the source language may be associated with a translation in the target language without any sort of exact sentence alignment or any other alignment.

The extracted bilingual data structure 109 stored in the bilingual data store 108 is also accessible by a formatter 110. Formatter 110 is, in one illustrative embodiment, a linguistic analysis component having an engine capable of parsing data received from the extracted bilingual data structure 109. For example, formatter 110 receives the extracted bilingual data structure 109 and parses the extracted bilingual data structure into noun phrases, verb phrases, sentences, or any other acceptable parsing configuration. In addition, while the data in the source language is parsed as described above, the formatter 110 is illustratively capable of aligning the target language in the extracted bilingual data structure 109 with the appropriate portion of the source language. Formatter 110 is also in communication with a formatted corpus data store 112, which is configured to store a formatted data corpus 113 that is parsed and aligned by the formatter 110. The formatted corpus data store 112 is illustrated in FIG. 4 as being a separate data store than the bilingual data store 108. However, it should be appreciated that all of the data in each of the data stores can be stored in a single data store without departing from the spirit and scope of the discussion.

Machine translation evaluation system 100 also includes an extraction engine 114. The extraction engine 114 is illustratively configured to receive information related to the structure of a source language in the form of ontological categories from a linguistic taxonomy 116 and translation data in the form of aligned pairs from the formatted data corpus 113. The extraction engine 114 is configured to create an evaluation example 118 from the linguistic taxonomies 116. The evaluation example 118 includes checkpoints of aligned pairs selected from the formatted data corpus 113 to provide enough examples to evaluate the candidate machine translator 102 over the ontological categories provided by the linguistic taxonomy 116.

As referred to above, the linguistic taxonomy 116 illustratively provides an ontology input indicative of a plurality of ontological categories of different types of linguistic phenomena by which a machine translator can be evaluated. In one illustrative embodiment, the ontological categories can be divided into a number of levels. One level of categories are word level. Word level categories include certain types of words, including ambiguous words, new words, that is, recently coined words, and preposition words. Ambiguous words are words with more than one meaning, and thus rely on context to determine their meaning. Therefore, an effective machine translator must not only recognize the word, but also recognize the context in which the word is being used. Other examples of word level categories include prepositions and new words, that is, words that have recently entered the source language. In addition to word level categories, there can be phrase level categories and sentence level categories.

There can be several types of phrase level categories that are identified in the linguistic taxonomy 116. One type of phrase level category is known as collocation. Collocation describes instances of two or more words commonly found close together, which suggests that they are used together. Other types of phrase level checkpoints include subject/predicate phrases, repetitive word combinations, named entities such as proper names, and idioms. Similarly, there can be a number of sentence level categories. Some examples of sentence level categories include compound sentences, passive voiced sentences and so forth. Different languages can have different types of sentence level categories to account for differences in grammar structure. The extraction engine 114 is thus configured to employ the linguistic taxonomies 116 to analyze and extract aligned pairs from the formatted corpus data store 112 to create the evaluation example 118, which includes a sufficient number of checkpoints to evaluate the ability of the candidate machine translator 102 to properly translate the identified categories discussed above. The evaluation example 118, as mentioned above, includes aligned pairs of words, phrases and sentences to represent the checkpoints. The aligned pairs include a source language example 120 and a corresponding target language example 122. The machine translation evaluation system 100 provides the source language example 120 of the aligned pairs to the candidate machine translator 102. The candidate machine translator 102 then translates the source language example 120 and provides a candidate translation 124 back to the machine translation system 100.

The machine translation system 100 also includes an evaluation engine 130. The evaluation engine 130 receives target language example 122 and the candidate translation 124. In addition, the evaluation engine 130 illustratively receives category information from the extraction engine 114. The evaluation engine 130 is configured to compare the candidate translation 124 provided by the candidate machine translator 102 with the target language example 122. The resultant comparison is used to evaluate the performance of the candidate machine translator 102 and describe the performance through a series of scores, discussed in more detail below.

Machine translation evaluation system 100 also includes a score records data store 132. The evaluation engine 130 is illustratively in communication with the score records data store 132 to store and recall score records 134 related to the evaluation of the candidate machine translator 102 or any other machine translator that has been evaluated by the evaluation engine 130 of machine translation evaluation system 100. The details of the evaluation and scoring of the candidate machine translator 102 by the evaluation engine 130 will be discussed in more detail below. The machine translation evaluation system 100 also illustratively includes a user interface 136, which is configured to have access to the score record datastore 132. The user interface 136 illustratively provides information related to the scores calculated by the machine translation system 100. The scoring information can be provided in any acceptable form, including being organized by category, by phrases in the source language example 120 or combinations thereof.

As discussed above, machine translation evaluation system 100 is configured to access source 106 to receive bilingual data for use by the machine translation evaluation system 100. In one illustrative embodiment, the machine translation evaluation system 100 intermittently accesses the source 106 to update the data in the bilingual data store 108. Source 106 is illustratively accessed at any frequency, regularly or irregularly.

In one illustrative embodiment, the bilingual data store 108 is capable of initiating access to the source 106 for the purposes of updating the data in the bilingual data store 108 without an external indication. Thus, the data stored in the bilingual data store 108 is periodically updated to provide new data to be extracted and parsed. The extractor 104, in one illustrative embodiment, is capable of automatically accessing the source 106 as well as automatically extracting aligned data strings from the data provided by the source 106.

The extraction engine 114 is illustratively configured to employ linguistic taxonomies 116 to analyze and extract aligned pairs from the formatted data corpus 113. Linguistic taxonomies 116 provide a linguistic model with linguistic phenomena that are used by the extraction engine 114 to create an evaluation text to be translated by the candidate machine translation system 102. In one illustrative embodiment, the linguistic taxonomies 116 are organized by categories that define the linguistic model referenced above. Categories in the linguistic taxonomy 116 are created to advantageously provide a broad linguistic model for evaluating the capabilities of the candidate machine translator 102.

To create an effective linguistic taxonomy, a set of criteria is illustratively established to define the categories. The following examples provide illustration of the types of criteria that can be used to define categories, although it should be appreciated that a particular evaluation system can use any acceptable criteria to define which categories should be included in the evaluation system. The first example of a criterion is the frequency that a particular linguistic phenomenon appears in the source language. Linguistic phenomena that appear frequently in the source language are advantageously included in the category definition so that such widely used phenomena are categorized for evaluation. One type of linguistic phenomena mentioned above is the ambiguous word. A particular ambiguous word that is widely used in the source language would thus be a candidate to be defined as a category or part of a category.

Another example of a criterion to consider is whether a particular linguistic phenomenon is widely accepted and authoritative. Under such a criterion, if the linguistic phenomenon can be described in a widely accepted system, then the criterion would provide weight for inclusion of the phenomenon as a defined category in the evaluation system. For example, a particular syntactic pattern that is widely accepted as a proper use of syntax in the source language would be a candidate for inclusion in the evaluation system based on this criterion. As another example, a widely known idiom in the source language would also be a candidate for inclusion based on this criterion.

Yet another example of a criterion to consider is whether a particular linguistic phenomenon can be effectively evaluated via the use of an identifiable algorithm. In such cases, the linguistic phenomenon can be predictably identified in the source language so that an algorithm can reliably identify the linguistic phenomenon. Thus, the evaluation system can determine whether the candidate machine translation system is capable of correctly translating the phenomenon. If the particular linguistic phenomenon cannot be predictably identified in the source language by an algorithm, this criteria would work against the phenomenon being included as a category.

Figure 5:
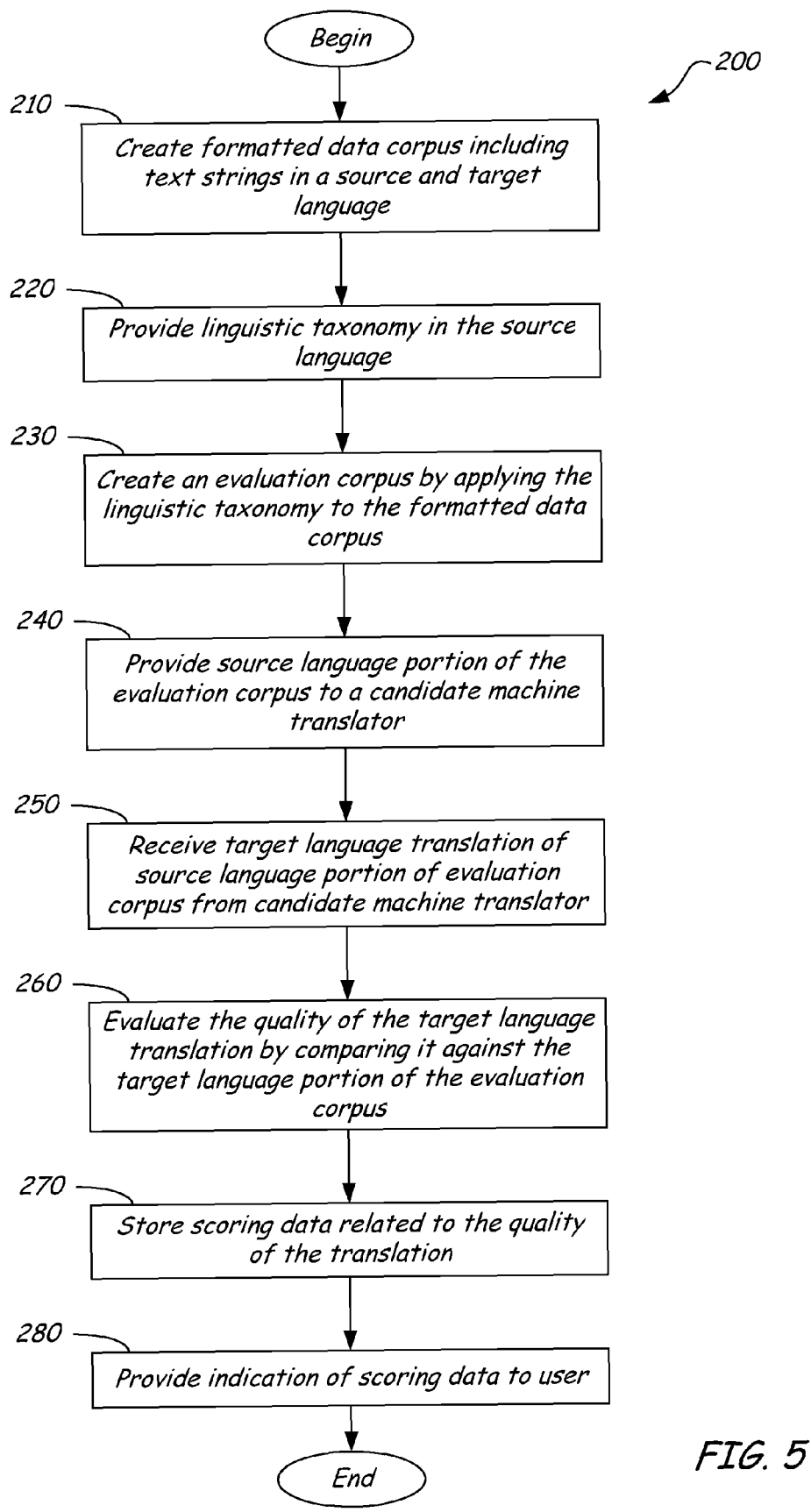
FIG. 5 is a flow chart illustrating a method of performing a linguistic evaluation of machine translations according illustrative embodiment.

The machine translation evaluation system 100 discussed above is configured to provide a linguistic evaluation of a candidate machine translation system such as system 102 according to one illustrative embodiment. FIG. 5 illustrates one embodiment of a method 200 for performing such a linguistic evaluation of machine translators by employing the machine translation evaluation system 100. Method 200 includes creating formatted data corpus 113 as is illustrated in block 210. The formatted data corpus 113 includes text strings in a source language and text strings in a target language that are aligned with the source language text strings. The method 200 illustratively automatically creates and/or updates the formatted data corpus 113 as is discussed in more detail below. The method 200 also includes providing a linguistic taxonomy 116 in the source language. This is represented by block 220. The linguistic taxonomy 116 provided in block 220 is, in one illustrative embodiment, a standard taxonomy that provides an ontological representation of the source language. Alternatively, providing a linguistic taxonomy 116 includes creating and/or updating a linguistic taxonomy based on the source language in the formatted data corpus 113. Updating a linguistic taxonomy may include updating a standard taxonomy or one previously created by the method provided in block 220.

In block 230, the linguistic taxonomy 116 provided in block 220 is applied to the formatted data corpus 113 created in block 210 to create an evaluation example 118 to be used for evaluating the candidate machine translator. The linguistic taxonomy 116, as discussed above, includes a plurality of linguistic phenomena, divided into categories, which represent the scope of the source language to be evaluated by the machine translation evaluation system 100. A plurality of checkpoints are identified in the evaluation of formatted data corpus 113 that provide translation evaluation opportunities for the candidate machine translator 102. The checkpoints, as discussed above, identify particular linguistic phenomena in the source language example 120 of the formatted data corpus 113. The evaluation example 118 includes the source language example with the identified checkpoints and a corresponding target language example 122.

The source language example 120 of the evaluation example 118 is illustratively provided to the candidate machine translator 102. This is illustrated in block 240. The method 200 is shown as creating a bilingual corpus and a linguistic taxonomy and then creating an evaluation example from the linguistic taxonomy and the bilingual corpus. However, it should be appreciated that it is not required that the bilingual corpus and the linguistic taxonomy be recreated every time that the evaluation corpus is provided to the candidate machine translator 102. Instead, a previously created evaluation corpus is, in one embodiment, provided to the candidate machine translator 102.

Once the source language example 120 of the evaluation example 118 is provided to the candidate machine translator 102, the machine translation evaluation system 100 receives candidate translation 124 from the candidate machine translator 102. The candidate translation 124 provided by the candidate machine translator 102 is illustratively a translation in the target language of the source language example 120 provided to the candidate machine translator 102. This is represented by block 250. The evaluation engine 130 then evaluates the quality of the candidate translation 124 and calculates scoring records 134 indicative of the translation quality for each of the checkpoints. This is illustrated in block 260.

The scoring records 134 calculated in block 260 are illustratively calculated using one or more methods. One illustrative method of calculating a scoring record 134 is through the employment of a template match. The template match is a binary scoring result indicative of whether the translation of a particular checkpoint provided by the candidate translation 124 of the candidate machine translator 102 matches the target language example 122 of the evaluation example 118 that is identified with the particular checkpoint. The template match scoring method is, for example, illustratively selected for use with checkpoints that are single words or strongly defined phrases, although it can be employed with other types of checkpoints.

Another illustrative scoring method is a contain measure. The contain measure scoring method provides a score (for example, between 0 and 1) that measures how much of the candidate translation 124 associated with a particular checkpoint contains words that are present in the corresponding part of the target language example 122. The contain measure is illustratively selected for use with checkpoints that are phrases that are not strongly defined.

Still another illustrative scoring method is an N-Gram measure, which measures the morphological similarity between the candidate translation 124 associated with a particular checkpoint and that part of the target language example 122 of the evaluation example 118 identified with the particular checkpoint. The N-gram measure method is discussed in more detail above. The N-gram measure is illustratively selected for use with checkpoints that include a sentence and provides a score within a given range (for example, between 0-1).

Still another illustrative scoring method is a structure method, which measures the similarity of syntactic trees that represent a portion of the candidate translation 124 and a portion of the target language example 122. The structure measure is illustratively selected for use with checkpoints that include a sentence with syntactical information available and provides a score within a given range (for example, between 0-1).

The scoring data acquired in block 260 by the machine translation evaluation system 100 is illustratively acquired by employing any number of the scoring methods described above or any other acceptable scoring method. Each checkpoint is evaluated by a particular scoring method, depending on the nature of the checkpoint. The examples discussed above provide illustrative methods for a number of different types of checkpoints. Thus, different types of checkpoints, such as individual words, phrases, sentences, and so forth, are illustratively scored using different methods. In addition, a general score for an entire candidate machine translator 102 is alternatively calculated by calculating a weighted result of some or all of the scores calculated for individual checkpoints. The machine translation evaluation system 100 then stores a scoring record 134 in scoring record data store 132 as is illustrated in block 270.

The machine translation evaluation system 100 also provides the scoring information calculated in method 200 to a user via a user interface 136. This is illustrated in block 280. The information provided illustratively includes scoring records related to individual checkpoints as well as alternatively including a general score for the candidate machine translator. Information regarding individual checkpoints is useful to indicate relative strong and weak points in a candidate machine translator. Such information is useful to determine whether to employ a particular machine translator or how a particular machine translator can be improved. The user interface 136 can be a display screen, or any other device or structure that provides information in a useable form for a user.

Figure 6:
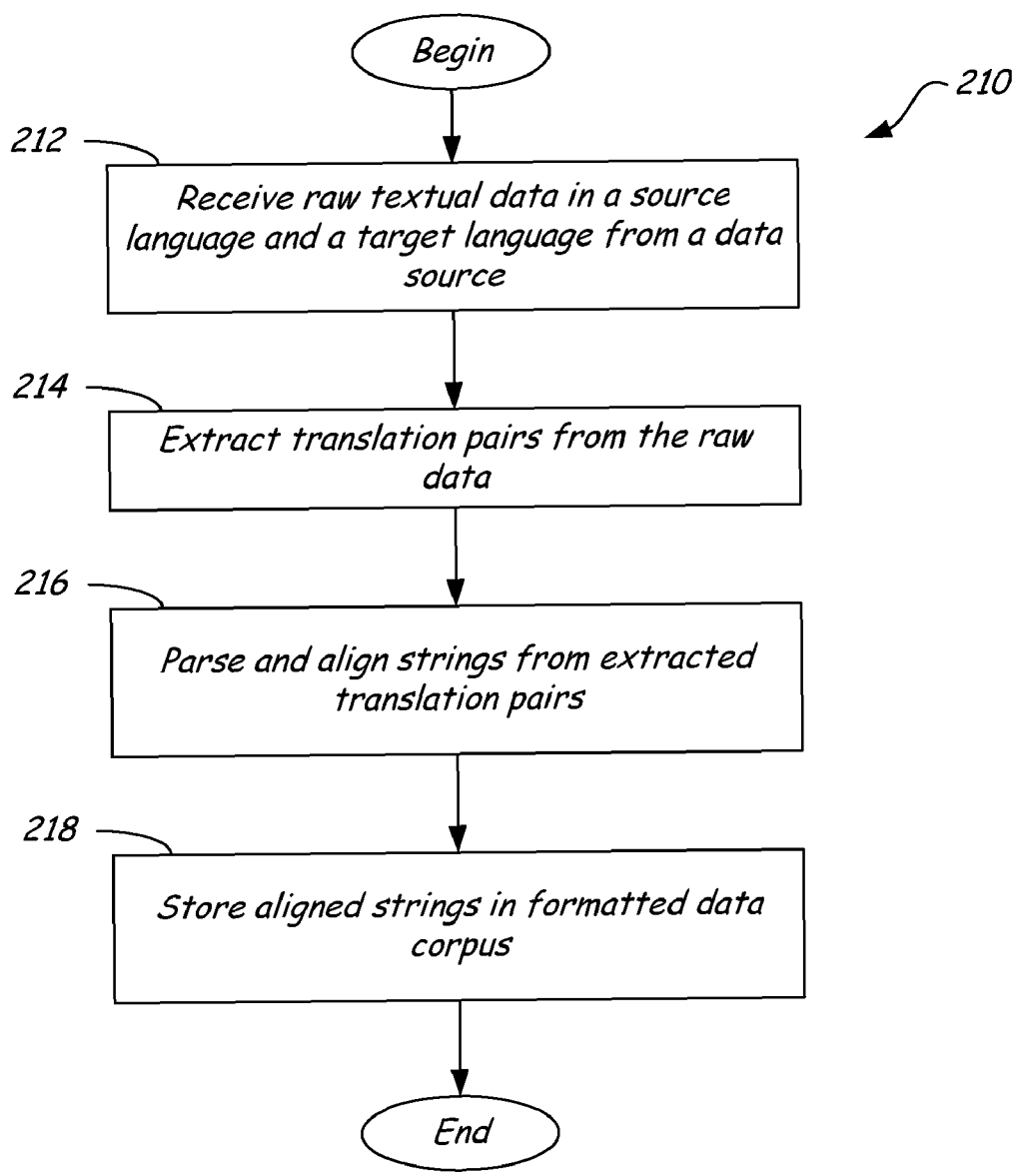
FIG. 6 is a flow chart illustrating a method of creating a formatted data corpus for use in the linguistic evaluation method of FIG. 3 according to one illustrative embodiment.

FIG. 6 illustrates the method 210 of automatically creating a formatted data corpus 113 shown in FIG. 5 in more detail according to one illustrative embodiment. In block 212, raw textual data is received in a source language and a target language from a data source. In one embodiment, the extractor 104 accesses source 106 (as shown in FIG. 4) to receive the raw data. The source 106 is illustratively located in a single location, such as in a data store. Alternatively, the source 106 can include a plurality of data stores, remotely located from each other, each of which are accessible to provide raw data to the machine translation evaluation system 100. Furthermore, source 106 is, in one embodiment, accessible by a plurality of raw data suppliers to allow updated data to be supplied to the source 106 from a variety of sources. The raw data illustratively includes text in a source language and a target language translation of the source language text. In one illustrative embodiment, the source language is Chinese and the target language is English. However, it should be appreciated that any languages can be used as the source and target languages. In fact, the methods described herein are language independent: they can be applied to any pair of source and target languages.

In block 214, translation pairs are extracted from the raw data. The extractor 104 extracts translation pairs in the source and target languages and stores the translation pairs as the extracted bilingual data structure 109 in bilingual corpus data store 108. Then, the formatter 110 accesses the extracted bilingual data structure 109, parses the text, creates checkpoints from the parsing, and aligns the text strings and stores the resultant formatted data corpus 113 in formatted corpus data store 112. This is illustrated in block 216.

Parsing the text strings illustratively includes parsing the source language into different types of language strings, including, for example, single words, noun phrases, verb phrases, sentences, and the like. In one illustrative embodiment, the parser provides information about the parsed language strings, including part of speech tags, dependency structures, and constituent structures. From this information, checkpoints corresponding to various categories are identified. In some instances, it may be advantageous to use additional techniques to create checkpoints. For example, in the case of new word and ambiguous word categories, existing dictionary tools and/or grammar rules can be used to create checkpoints.

Because many checkpoints are assigned based on the results provided by parsing the source language, it is advantageous for the parsing operation to provide reliable results. In one illustrative embodiment, the method illustrated in block 216 includes utilizing a plurality of parsing devices. An intersection of the results provided by each of the parsing devices can then be utilized. The intersection results of known parsers have been shown to provide more accurate development of checkpoints as well as providing a reduction of the number of checkpoints created.

Once the source language has been parsed and the checkpoints created, the resultant language strings are aligned with corresponding strings in the target language. The aligned pairs of parsed strings, which represent check points in the source language and aligned target language translations, are added to the formatted data corpus 113 and stored in the formatted corpus data store 112. This is illustrated in block 218. Except in cases such as sentence level checkpoints, which have references in the target language consisting of whole sentences, and checkpoints like new words or idioms, which employ dictionary or rules based references in the target language, alignment of the source and target language impact the quality of a reference for a particular checkpoint.

Thus, in one illustrative embodiment, the reliability of a particular reference, r, is measured by comparing it against a lexical dictionary. The matching degree $DM(r)$ of a reference r with its corresponding checkpoint c is defined as:

$$DM(r) = \frac{\sum CoCnt(r, Dic(c)) + \sum CoCnt(c, Dic(r))}{WordCnt(r) + WordCnt(c)} + k.$$

Dic(x) represents a collection of words considered to be a translation of the words in r or c (as the case may be). CoCnt (x, y) represents a count of the common words in x and y. Thus, CoCnt (r,Dic (c)) is a count of the number of words that are in both r and Dic (c). WordCnt(x) represents a count of the number of words in x. Because the collection of words in Dic(x) and Dic(y) are not necessarily all encompassing, a DM score of zero does not necessarily mean that a reference is completely wrong. Thus, a small value, k, is added to the DM calculation to account for such situations. By analyzing the alignment quality, determinations can be made about how large of a formatted data corpus is sufficient to provide an acceptably reliable alignment between the source and target language at checkpoints.

Note that the steps illustrated in FIG. 6 describe a method for creating a formatted data corpus. It should be appreciated that the method can be employed to update an existing formatted data corpus by incorporating newly received or updated raw data into a previously created formatted data corpus.

Figure 7:
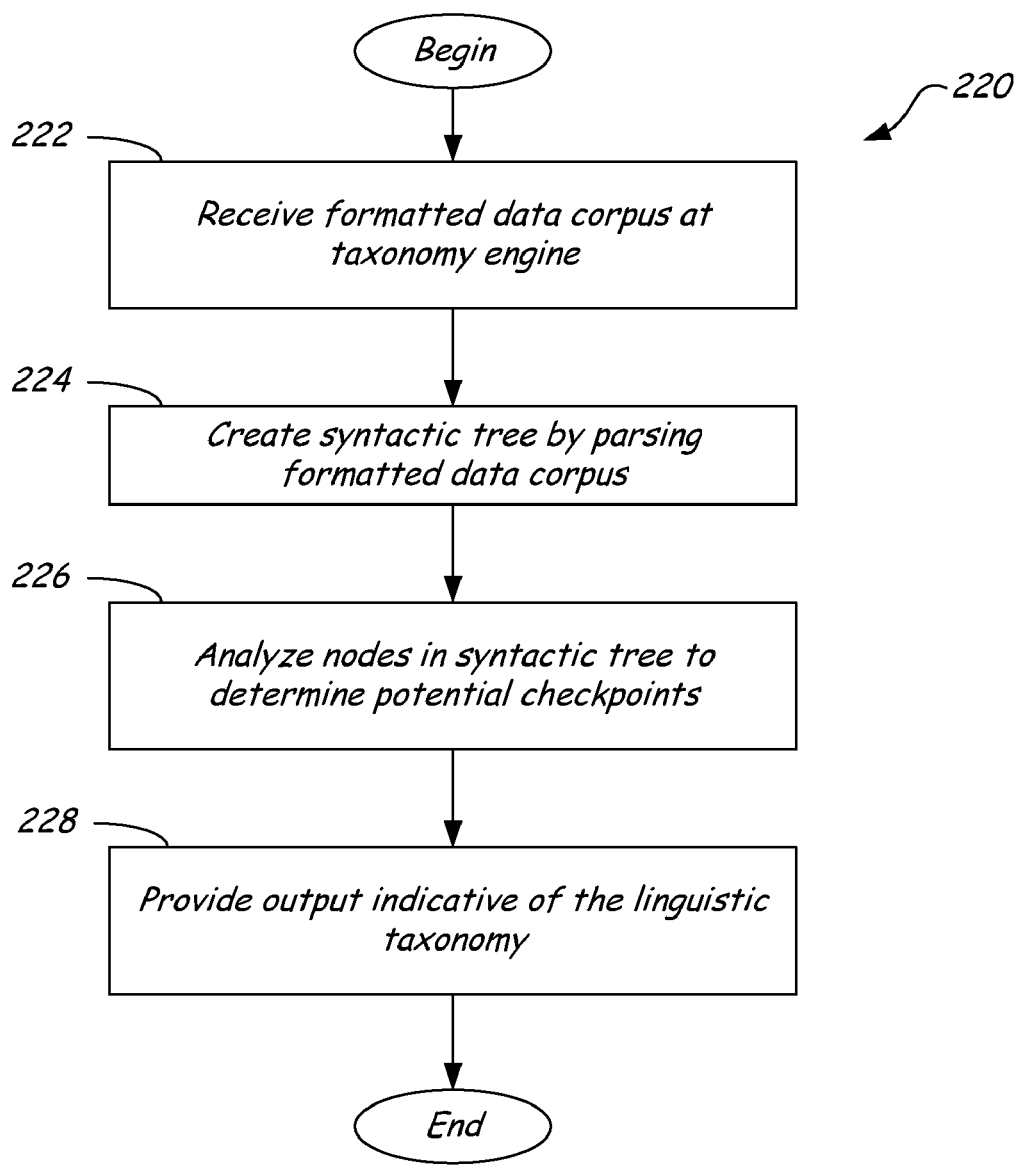
FIG. 7 is a flowchart illustrating a method of creating a linguistic taxonomy for use in the linguistic evaluation method of FIG. 3 according to one illustrative embodiment.

FIG. 7 illustrates the method 220 first illustrated in FIG. 5 of creating and/or updating a linguistic taxonomy in the source language in more detail. In block 222, the formatted data corpus 113 is received by a taxonomy engine (not shown) configured to create the linguistic taxonomy. The taxonomy engine then automatically parses the formatted data corpus 113 to create a syntactic tree in block 224. The syntactic tree is then analyzed in block 226 to determine nodes that may be checkpoints for the purposes of analyzing translations made by the candidate machine translator. Any lexicalized node, including non-terminal nodes in the syntactic tree, can be a checkpoint. Once the syntactic tree is created, language in the target language is matched to the nodes in the syntactic tree. The language selected for each node associated with a particular structure in the source language. The language selected for a particular node is selected based on any number of different factors or combination of factors. In one instance, collocation with source language in the formatted data corpus 113 is a factor. Other factors include dictionary translations and part of speech tags.

The method 220 illustratively selects checkpoints such as lexicalized nodes that appear in the syntactic tree with high frequency. High frequency lexicalized nodes are selected as word level checkpoints. In addition, lexicalized nodes with a high frequency of word collocation (between the source and target language) are selected as word collocation checkpoints. High frequency non-terminal nodes and node types are also identified as phrase level checkpoints. In addition, previously defined word, phrase, and syntax ontologies are illustratively applied to the syntactic tree to identify checkpoints. Once the taxonomy engine has identified checkpoints, it provides an output representative of the linguistic taxonomy, as represented in block 228. In one embodiment, the output is an XML representation.

The embodiments discussed above illustrate several desirable advantages. By providing scoring of individual checkpoints, information is provided to a user about specific areas in which a particular machine translator can be improved. Individual checkpoint scores can indicate how a particular candidate machine translator can be improved by modifying the translation of particular words, phrases, or sentences associated with a checkpoint. In addition, automatically creating and updating the references including the selection of checkpoints provides the ability to quickly and economically create references that include additional translation information without having to manually create checkpoints and modify references.

Figure 8:
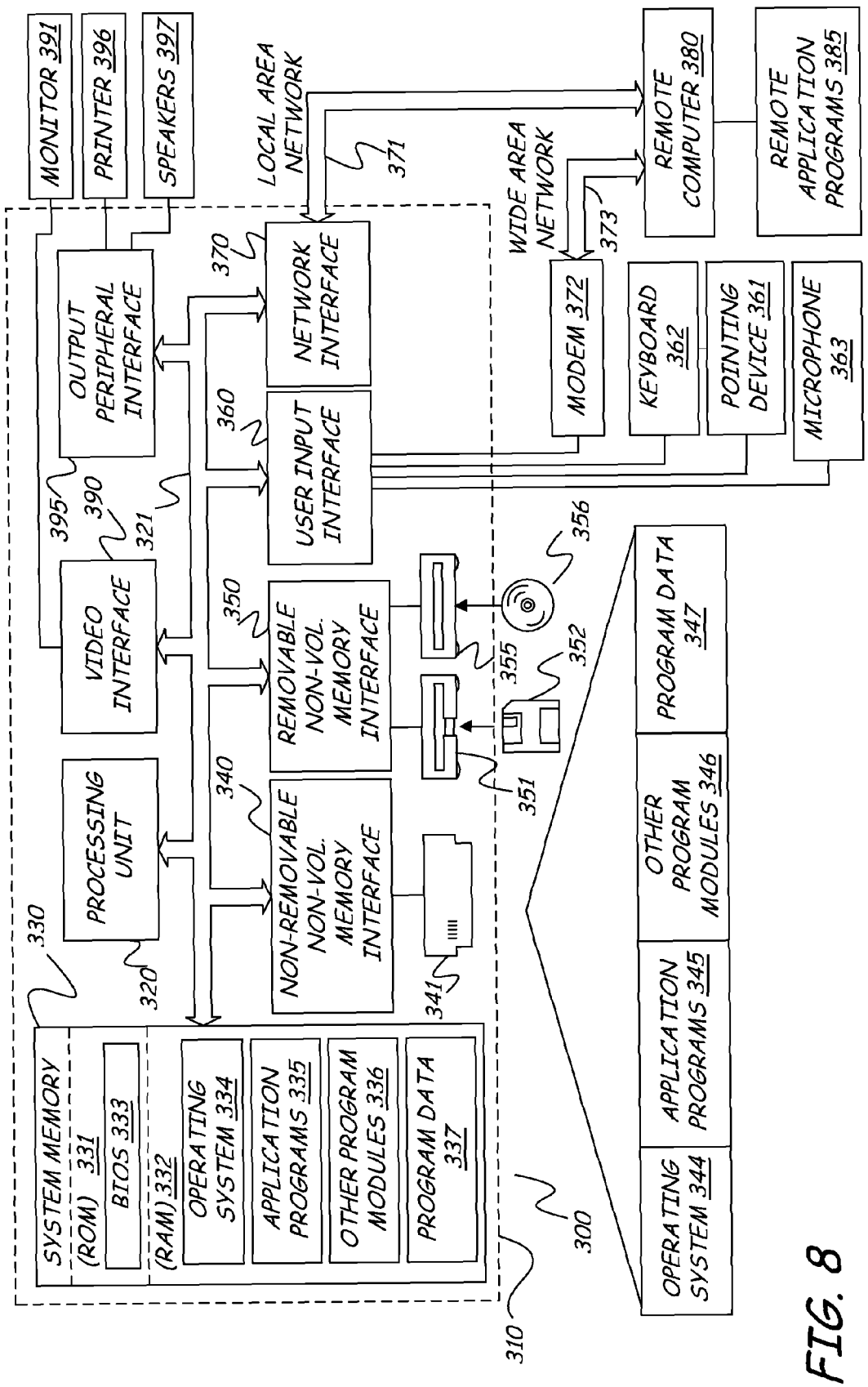
FIG. 8 is a block diagram of one computing environment in which some embodiments may be practiced.

The embodiments discussed above can be implemented in any one of a number of different platforms. FIG. 8 illustrates one example of a suitable computing system environment 300 on which embodiments such as the ones discussed above may be implemented. The computing system environment 300 is only one example of a suitable computing environment and is not intended to suggest any limitation as to the scope of use or functionality of the claimed subject matter. Neither should the computing environment 300 be interpreted as having any dependency or requirement relating to any one or combination of components illustrated in the exemplary operating environment 300.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 8, an exemplary system for implementing some embodiments includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. A number of data structures including data structure 109, formatted data corpus 113 and score records 134 are described as being stored on one or more data stores. These data stores, in one illustrative embodiment, are computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 8 illustrates operating system 334, application programs 335, other program modules 336, and program data 337.

The computer 310 may also include other removable/non-removable volatile/nonvolatile computer storage media. The data stores discussed above, in one illustrative embodiment, are computer storage media. By way of example only, FIG. 8 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 8, provide storage of computer readable instructions, data structures, program modules and other data for the computer 310. In FIG. 8, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies.

A user may enter commands and information into the computer 310 through input devices such as a keyboard 362, a microphone 363, and a pointing device 361, such as a mouse, trackball or touch pad. Other input devices (not shown) may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 is operated in a networked environment using logical connections to one or more remote computers, such as a remote computer 380. The remote computer 380 may be a personal computer, a hand-held device, a server, a router, a network PC, a peer device or other common network node, and typically includes many or all of the elements described above relative to the computer 310. A user may, in some embodiments, access the machine translation evaluation system 100 from a remote computer such as computer 380. The logical connections depicted in FIG. 8 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 8 illustrates remote application programs 385 as residing on remote computer 380. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for evaluating translation quality of a machine translator, comprising:
 a bilingual data generator configured to intermittently access a wide area network and generate a bilingual corpus from data received from the wide area network;
 a linguistic analysis component configured to add otherwise latent linguistic information to the bilingual corpus to obtain an augmented bilingual corpus;
 an example extraction component configured to receive an ontology input indicative of a plurality of ontological categories of evaluation and to extract evaluation examples from the augmented bilingual corpus based on the ontology input; and a processor that is component of a computing device that utilizes an evaluation component to evaluate translation results from translation by a machine translator of the evaluation examples and to score the translation results according to the ontological categories.

2. The system of claim 1 wherein the bilingual corpus includes source data representative of text in a source language and corresponding target data representative of text in a target language and wherein the example extraction component identifies a plurality of checkpoints with each checkpoint indicative of a portion of the source data.

3. The system of claim 2 wherein the evaluation component is configured to score the translation results by producing a plurality of checkpoint scores and wherein each checkpoint score is indicative of the quality of the translation results for a given checkpoint.

4. The system of claim 3 wherein the evaluation component is configured to develop a total score based on the plurality of checkpoint scores.

5. The system of claim 3 wherein at least one of the checkpoint scores is indicative of the syntactic similarity between the translation results and the target data associated with the checkpoint.

6. The system of claim 3 wherein at least one of the checkpoint scores is indicative of a morphological similarity between the translation results and the target data associated with the checkpoint.

7. A method of evaluating translation quality of a machine translator, comprising:
   intermittently generating and updating a bilingual corpus, augmented with linguistic information generated from performing semantic analysis of the bilingual corpus;
   when the bilingual corpus is generated, extracting evaluation examples, each evaluation example being extracted to test the machine translator in one of a plurality of predefined categories of evaluation;
   receiving translation results from the machine translator, for the evaluation examples; and
   utilizing a processor that is a component of a computing device to evaluate the translation results in each of the predefined categories of evaluation; and
   storing evaluation results for display to a user.

8. The method of claim 7 and further comprising:
   displaying the evaluation examples for editing by the user.

9. The system of claim 8 wherein at least one of the checkpoint scores is indicative of a match between the translation results and the target data associated with the checkpoint.

10. The method of claim 7 and further comprising:
    displaying the evaluation results to the user in a hierarchical structure that indicates a relationship among the categories of evaluation.

11. The method of claim 7 wherein extracting evaluation examples comprises:
    exposing the evaluation examples to a community over a network; and
    receiving additional evaluation examples from the community over the network.

12. The method of claim 7 wherein generating and intermittently updating the bilingual corpus comprises:
    augmenting the bilingual corpus with the linguistic information to more specifically assign each of the evaluation examples to an individual category of evaluation.

13. The method of claim 7 wherein receiving the translation results comprises:
    receiving the translation results over a network and further comprising displaying the translation results to the user over a wide area network.

14. The method of claim 7 and further comprising:
    repeating the step of extracting each time the bilingual corpus is updated.

15. The method of claim 7 and further comprising:
    calculating a total score for the machine translator.

16. The method of claim 7 wherein intermittently generating and updating the bilingual corpus comprises:
    receiving from a data source a representation of textual data in a source language and a corresponding target language.

17. The method of claim 16 wherein intermittently generating and updating the bilingual corpus further comprises:
    extracting a plurality of translation pairs from the representation with each translation pair including data in the source language and data corresponding to a translation in the target language.

18. The method of claim 17 wherein intermittently generating and updating the bilingual corpus further comprises:
    selecting a checkpoint from the plurality of translation pairs by assigning an ontological category to the source language portion of the translation pair; and
    storing the checkpoint in an evaluation corpus.

19. The method of claim 18 wherein selecting the checkpoint from the plurality of translation pairs includes employing a grammar rule to select the checkpoint.

20. The method of claim 18 wherein selecting the checkpoint from the plurality of translation pairs includes employing a dictionary to select the checkpoint.

* * * * *